(12) United States Patent
Dance

(10) Patent No.: US 11,119,989 B1
(45) Date of Patent: Sep. 14, 2021

(54) DATA AGGREGATION WITH SCHEMA ENFORCEMENT

(71) Applicant: Amazon Technologies, Inc., Seattle, WA (US)

(72) Inventor: Douglas Baldwin Dance, Kent, WA (US)

(73) Assignee: Amazon Technologies, Inc., Seattle, WA (US)

(*) Notice: Subject to any disclaimer, the term of this patent is extended or adjusted under 35 U.S.C. 154(b) by 217 days.

(21) Appl. No.: 16/008,886

(22) Filed: Jun. 14, 2018

(51) Int. Cl.
*G06F 16/21* (2019.01)
*G06F 16/28* (2019.01)
*G06F 16/907* (2019.01)

(52) U.S. Cl.
CPC .......... *G06F 16/211* (2019.01); *G06F 16/283* (2019.01); *G06F 16/284* (2019.01); *G06F 16/907* (2019.01)

(58) Field of Classification Search
CPC .................................................. G06F 16/211
See application file for complete search history.

(56) References Cited

U.S. PATENT DOCUMENTS

| 8,401,987 | B2 | 3/2013 | Agrawal et al. | |
|---|---|---|---|---|
| 8,825,537 | B2 | 9/2014 | Dick et al. | |
| 8,892,585 | B2 | 11/2014 | El Husseini et al. | |
| 9,311,643 | B2 | 4/2016 | Dixon et al. | |
| 9,442,963 | B2 | 9/2016 | Ritto et al. | |
| 9,904,933 | B2 | 2/2018 | Taira et al. | |
| 2003/0004959 | A1* | 1/2003 | Kotsis | G06F 16/30 |
| 2005/0283488 | A1* | 12/2005 | Colossi | G06F 16/283 |
| 2015/0066861 | A1* | 3/2015 | Ritto | G06F 16/21 |
| | | | | 707/661 |
| 2016/0103872 | A1* | 4/2016 | Prophete | G06F 16/2428 |
| | | | | 707/722 |

\* cited by examiner

*Primary Examiner* — Syling Yen
(74) *Attorney, Agent, or Firm* — Robert C. Kowert; Kowert, Hood, Munyon, Rankin & Goetzel, P.C.

(57) ABSTRACT

Methods, systems, and computer-readable media for data aggregation with schema enforcement are disclosed. A plurality of validated transactions are determined from a set of transactions associated with a first interval. The validated transactions are determined using enforcement of one or more schema definitions associated with the set of transactions. The validated transactions are stored using a data object associated with the first interval. An aggregation for a longer duration is generated based at least in part on an aggregation definition. The aggregation definition is associated with one or more of the schema definitions and comprises one or more attributes. The aggregation represents transactions in the first interval and in one or more additional intervals, and the transactions represented in the aggregation are validated for the one or more of the schema definitions and comprise the one or more attributes.

20 Claims, 7 Drawing Sheets

DATA AGGREGATION WITH SCHEMA ENFORCEMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Complex systems may include many services that interact with one another in varied ways.

Figure 1A:
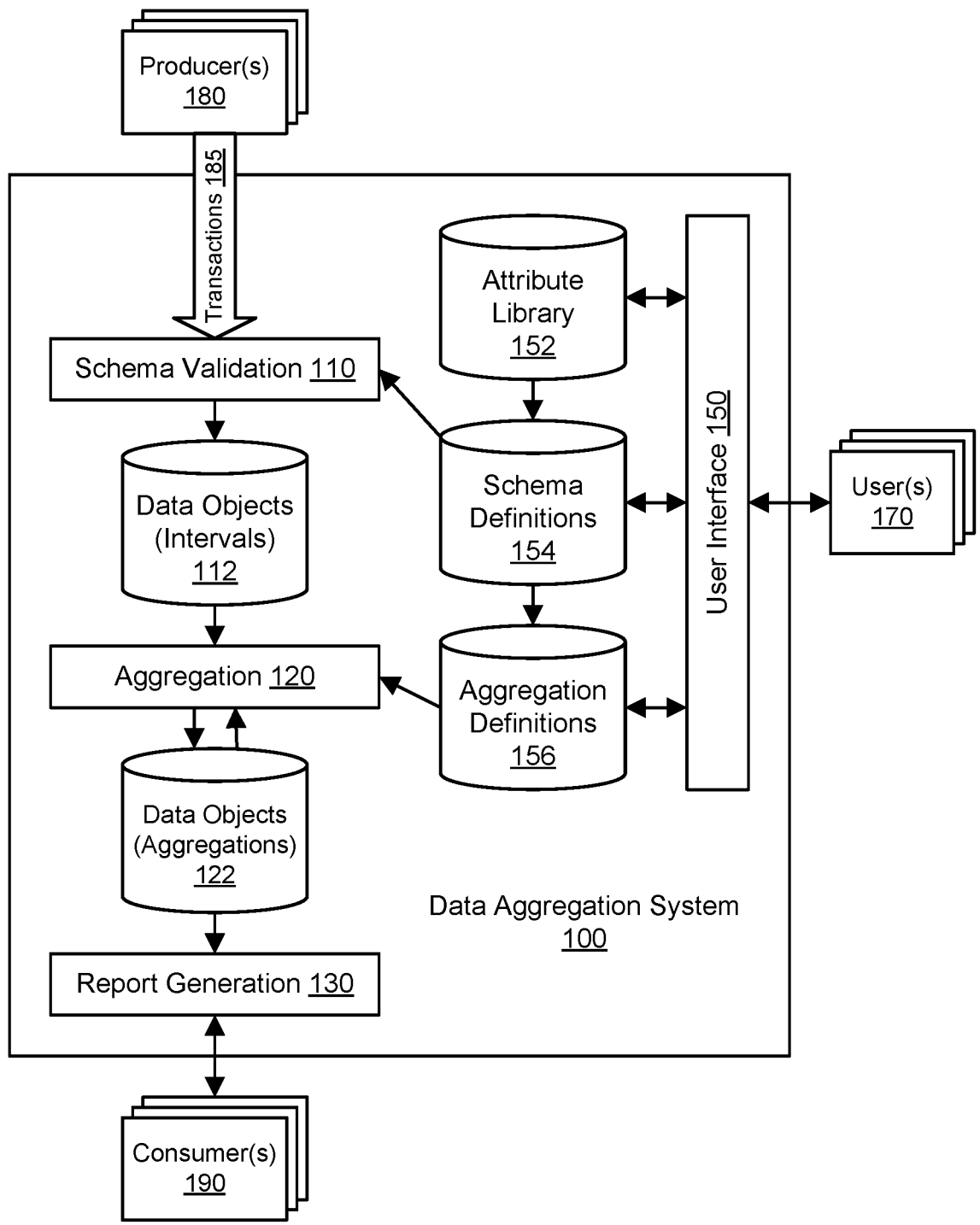
FIG. 1A and FIG. 1B illustrate an example system environment for data aggregation with schema enforcement, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for data aggregation with schema enforcement are described. A data aggregation system may aggregate data from different intervals of time in a scalable manner while ensuring data quality. The system may store predefined schema definitions, aggregation definitions, and other definitions for manipulating data. When transactions (or other events) are generated by producers, the system may first enforce any relevant schema definitions. A particular transaction may declare one or more schemas, and the transaction (e.g., its contents and/or source) may be evaluated to determine if the schema(s) are met. Validated transactions may be added to a data object for the current time interval, while invalidated transactions may not. In one embodiment, a transaction may be written to one and only one time interval, and the data object for an interval may be considered immutable once the interval closes. An interval may be aggregated or subjected to other analysis shortly after its close. Multiple intervals may be combined into an aggregation according to an aggregation definition. Aggregation definitions may be nested in a tree-like structure. An aggregation definition may declare one or more schema definitions or may inherit them from a parent aggregation definition. An aggregation definition may also indicate one or more attributes and/or values on which to create a slice of data (an aggregation). When transactions are combined in an aggregation, the transactions are guaranteed to meet the schema definition(s) and to include the attributes and/or values associated with the aggregation definition. Schema definitions and aggregation definitions may include metadata such as definition owners and aggregation parents as well as references to transactions represented in aggregations, and such metadata may be used to drill down into individual transactions from any level of aggregation and/or to link consumers of transactions to producers of those transactions. Using the techniques described herein, schemas and aggregations may be defined easily by users (e.g., without needing to write program code or database queries) and may then be applied automatically as transactions or events are generated.

As one skilled in the art will appreciate in light of this disclosure, embodiments may be capable of achieving certain technical advantages, including some or all of the following: (1) improving the speed of generating data aggregations and reports using computing devices, e.g., such that aggregations and reports can be generated in near-real-time with the close of relevant time intervals; (2) improving the number of transactions that can be aggregated by using a highly scalable approach towards maintaining schema definitions and aggregation definitions; (3) improving data quality by performing schema enforcement at an early stage; (4) improving the ability to represent arbitrary schemas by removing a reliance on relational databases that limit the number of columns per table; (5) improving the flexibility and ease of defining new schemas and new aggregations, e.g., without requiring a developer to write new program code or write database queries; (6) improving the auditability of reports by using data structures that link data producers and data consumers; (7) improving use of memory resources while providing lossless aggregation; (8) improving scalability for aggregations through the use of efficient data structures; and so on.

In some prior approaches, relational databases were used to maintain schemas. However, because relational databases may be constrained in terms of the number of columns a table can have, such systems may not be sufficiently scalable. Additionally, changing a schema stored using a relational database may be difficult, e.g., if the entire relational database must be taken offline to make changes. Furthermore, prior approaches to data aggregation tended to be lossy, e.g., such that knowledge of the producer of data would be lost in an aggregation. The data aggregation system described herein may avoid a reliance on relational databases and provide a more flexible and scalable solution that also maintains contextual metadata (e.g., the producer of the data) at different levels of aggregation.

FIG. 1A illustrates an example system environment for data aggregation with schema enforcement, according to one embodiment. A data aggregation system 100 may enable accurate, timely, and complete reporting that provides insight and visibility into the state of a system. Due to its scalability, the data aggregation system may be used for reporting on entities that are too large for external, third-party solutions. The data aggregation system may generate reports that meet reporting requirements associated with finance and accounting. In one embodiment, the data aggregation system may be used with a distributed computing environment that separates online transaction processing (OLTP) from online analytical processing (OLAP). The OLTP subsystems may represent producers 180 of data, and the OLAP subsystems may represent consumers 190 of the data. Using a reporting component 130, the data aggregation system may be used to produce financial statements and/or other reports to meet requirements for external entities (e.g., governmental entities) and/or internal entities. Reports may include aggregated data derived from different time intervals. Reports may permit users to drill down to various layers of aggregation and ultimately to individual transactions. Aggregations may be customized by users. Using the data aggregation system, the accuracy and/or completeness of reports may be determined.

In one embodiment, the data aggregation system 100 may aggregate data from different time intervals such that the data is represented at different levels of granularity. The lowest level of granularity may represent individual transactions 185. In one embodiment, a time interval may begin at a starting time and end at an ending time. In one embodiment, a time interval may include transactions that occur during that interval, and a transaction may belong to one and only one interval. In one embodiment, intervals may not be time-bound but may instead represent other sets of transactions or events that form a continuous sequence with respect to other intervals. For example, one interval may be closed when the quantity of transactions in the interval or the size of the corresponding data object has reached a threshold amount, and another interval may be opened to capture the next transaction(s). Transactions may be generated by one or more producers 180. Transactions may include financial transactions, accounting transactions, any other exchanges between two or more entities, or any other events (e.g., memory accesses, storage accesses, service calls, performance and usage metrics, and other events that are logged). The terms "transactions" and "events" may be used interchangeably herein. The entities associated with the transactions may represent humans or automated systems. Transactions may also be referred to as a journal lines.

In some embodiments, using aggregation, transactions may be represented at additional levels of granularity such as minutes, hours, days, weeks, months, years, and so on. In one embodiment, an interval at a higher level of granularity may be generated by aggregation of multiple intervals of a lower granularity. For example, using an aggregation component 120, twenty-four consecutive one-hour intervals may be added, summarized, or otherwise aggregated into a single one-day interval. As another example, twelve consecutive one-month intervals may be added, summarized, or otherwise aggregated into a single one-year interval. The use of intervals with distinct boundaries may permit the data aggregation system 100 to guarantee the completeness of data within the interval or instead to determine which sub-intervals are missing from the interval. After an interval closes (e.g., after the ending time has occurred), the data aggregation system may generate an immutable object that includes or references transactions associated with the interval. The immutable objects for intervals 112 may be stored using any suitable storage techniques. In one embodiment, the contents of an immutable object for an interval may not be changed, e.g., by further aggregation or reporting actions or by transactions in other intervals. In one embodiment, the data aggregation system may provide consumers 190 or other end users with data in a near-real-time manner, such that reports for a time interval may be generated (using a report generation component 130) soon after the close of the interval. In one embodiment, the data aggregation system may permit a user to drill down into individual transactions from any level of granularity.

The data aggregation system 100 may use up-front schema enforcement to guarantee data quality. In one embodiment, the schema enforcement may guarantee that data behaves according to predefined rules or schemas that have been validated for that data. In one embodiment, using a schema validation component 110, data may be validated before being added to an interval or otherwise rejected and potentially discarded. In one embodiment, a transaction may be associated with one or more schema definitions 154. A schema definition may also be referred to as a reporting treatment definition. A schema definition may include information such as a name, a version identifier, an owner, a human-readable description, and a set of one or more attributes. Different schema definitions may be modeled and stored independently of each other, e.g., not in the same relational database table with constraints on the number of columns. Transactions that are validated with respect to the relevant schema(s) may be stored using data objects 112 that represent intervals.

In one embodiment, a transaction may be validated (and added to the current interval in the data objects 112) if and only if the one or more attributes specified in a relevant schema definition are found in the transaction, and a transaction may be rejected (and not added to the current interval) if any of the one or more attributes are not found in the transaction. For example, a schema definition called "advertising1.0" may be validated for a transaction if the transaction includes an attribute named "source" and a value for that attribute of "advertising department." If a transaction is associated with that schema and meets the schema (e.g., it includes the attribute named "source" and a value for that attribute of "advertising department"), then that transaction may be stored persistently with the current interval. However, if a transaction is associated with that schema and fails to meets that schema (e.g., it does not include an attribute named "source" or a value for that attribute of "advertising department"), then that transaction may not be stored persistently with the current interval. To associate a transaction with one or more schemas, an individual transaction may explicitly declare the schema definition(s) which it expects to meet. As will be discussed below, schemas may then be used for data aggregation.

In one embodiment, a rule evaluation system may be used to implement schema validation 110 for transactions. The rule evaluation system may apply business logic to raw transactions 185, where rules establish expectations for a schema for a given transaction. For example, if a transaction is validated with respect to the schema named advertising1.0, then the rule evaluation system may derive a new attribute for the transaction that identifies the validated schema by name. In one embodiment, a new schema may be created by a user 170 via a user interface 150 and without the user writing program code. Users 170 may represent producer(s) 180, consumer(s) 190, and/or other parties. In one embodiment, a new schema may be available throughout the data aggregation system 100 only after the new schema has been approved by a group of administrators or other user(s) with sufficient privileges. In one embodiment, a schema definition may be expressed according to the following example:

```
'SchemaDefinition@1.0'::{
   name: <symbol>,
   owner: <symbol>,
   description: <string>,
   attributes: [
      <symbol>,
   ],
}
```

In one embodiment, the data aggregation system may maintain an attribute library 152. The attribute library may represent a shared set of metadata that can be used in the underlying transactions (or events) and also in any reports generated by the data aggregation system. Attributes in the attribute library may represent characteristics of transactions (or events). In one embodiment, a new attribute may be added by a user 170 via a user interface 150 and without the user writing program code. For example, a user may add an attribute named "advertiser name" to the attribute library. In one embodiment, the user may also add a set of allowable values for the attribute. After the new attribute has been added to the attribute library, schemas that reference the "advertiser name" attribute may be created. For example, a particular advertising-related schema may be validated for a transaction if the transaction includes the attribute "advertiser name" (and potentially one of the allowed values for that attribute). In one embodiment, individual attributes may be associated with owners, e.g., to provide auditability and accountability.

Intervals (including their transactions or events) may be stored by the data aggregation system 100 using data objects 112. In one embodiment, the data aggregation system may store each interval as an individual data object. In one embodiment, the data aggregation system may store a plurality of intervals in one data object and another plurality of intervals in another data object. To store such objects, the data aggregation system may use internal storage resources (e.g., storage maintained by the data aggregation system itself) and/or storage resources maintained by one or more external storage services. For example, a plurality of intervals may be stored in one "bucket" in one storage service, and an index to the locations of individual intervals within that bucket may be stored by another storage service.

After intervals are generated in an immutable way, the data aggregation system 100 may generate aggregations of those intervals according to aggregation definitions 156. An aggregation definition may define a specific slice of data. Aggregation definitions may be recursive, such that one aggregation definition may identify another aggregation definition as its parent. Using recursive or nested aggregation definitions, the data aggregation system may generate slices of slices. Recursive or nested aggregation definitions may define a tree of aggregation definitions, and the tree may represent instructions on how to pre-compute transactions into their respective slices or sub-slices at the various levels of aggregation. An aggregation definition may indicate one or more schema definitions 154, such that data in an aggregation may include only those transactions that meet the indicated schema(s). In one embodiment, the up-front schema enforcement discussed above may guarantee that transactions follow the schemas that the transactions indicate they follow. In one embodiment, if an aggregation definition does not indicate one or more schemas but does indicate a parent, then the aggregation definition may follow the schema definition(s) of that parent aggregation. In one embodiment, aggregations may be automatically generated at the close of the relevant intervals, e.g., using a precompute pipeline. Automatic generation of aggregations for new intervals according to predefined aggregation definitions may be referred to as precomputing those aggregations.

An aggregation definition may instruct the data aggregation system 100 how to process transactional or event data in intervals, e.g., by generating a slice having particular characteristics. In one embodiment, an aggregation definition may indicate the attributes of transactions in the slice. For example, the list of attributes may indicate that transactions in a particular level of aggregation include a particular account number, a particular company code, and so on. Aggregations may represent sums of particular values, and an aggregation definition may also indicate attributes to be summed, e.g., using a section named addition_operations. For example, a total amount of sales of goods (as expressed in a relevant currency) may be summed over one or more time intervals. In some embodiments, sums may be produced for more than one attribute according to an aggregation definition. In one embodiment, a new aggregation definition may be created by a user 170 via a user interface 150 and without the user writing program code or a database query. In one embodiment, an aggregation definition may be expressed according to the following example:

```
'AggregationDefinition@1.0'::{
   name: <symbol>,
   owner: <symbol>,
   description: <string>,
   schema_definitions: [ // optional
      <symbol>,
   ],
   parent_aggregation_definition: <symbol>, // optional
   attributes: [
      <symbol>,
   ],
   addition_operations: [ // optional
      {
         value_attribute: <symbol>,
         unit_attribute: <symbol>, // optional
         sign_interpretation: { // optional
            sign_attribute: <symbol>,
            positive_value: <any>,
            negative_value: <any>,
         },
      },
```

-continued

```
    ],
  }
```

In one embodiment, filter definitions may provide additional functionality to the functionality of aggregation definitions. A filter definition may refer to an aggregation definition in order to specify the level at which to apply the filter. The filter logic may be parameterized, and a filter definition may express basic logic operations. Like an aggregation definition, a filter definition may provide the instructions for creating slices of data. Filter definitions may be stored along with the aggregation definitions 156 of using similar storage techniques. In one embodiment, a filter definition may be expressed according to the following example:

```
'FilterDefinition@1.0'::{
    name: <symbol>,
    owner: <symbol>,
    description: <string>,
    aggregation_definition: <symbol>,
    parameters: [// optional
        <symbol>,
    ],
    filter: <'CompositeFilter@1.0'>,
}
'CompositeFilter@1.0'::( )// LogicFilter or OperatorFilter
'LogicFilter@1.0'::(
    <'&&'|'||'>
    <'CompositeFilter@1.0'>
    <'CompositeFilter@1.0'>
)
'OperatorFilter@1.0'::(
    <'=='|'!='|'>'|'>='|'<'|'<='>
    <[
        <attribute|sum>::<symbol>, // attribute refers to an
            attribute that was aggregated while sum refers to
            a sum that was computed
    ]>
    <[
        <attribute|parameter|value>::<symbol>, // attribute
            refers to the value of an attribute, parameter refers
            to the value of a parameter and value is a direct
            value
    ]>
)
```

In one embodiment, merge definitions may provide additional functionality to the functionality of aggregation definitions. A merge definition may provide an instruction to merge all values in an aggregation definition into a single value. For example, a merge definition may be useful when data that has been sliced by day can be merged so that the sum represents an entire month. Like an aggregation definition, a merge definition may provide the instructions for creating slices of data. Merge definitions may be stored along with the aggregation definitions 156 of using similar storage techniques. In one embodiment, a merge definition may be expressed according to the following template:

```
'MergeDefinition@1.0'::{
    name: <symbol>,
    owner: <symbol>,
    description: <string>,
    aggregation_definition: <symbol>,
}
```

Figure 6:
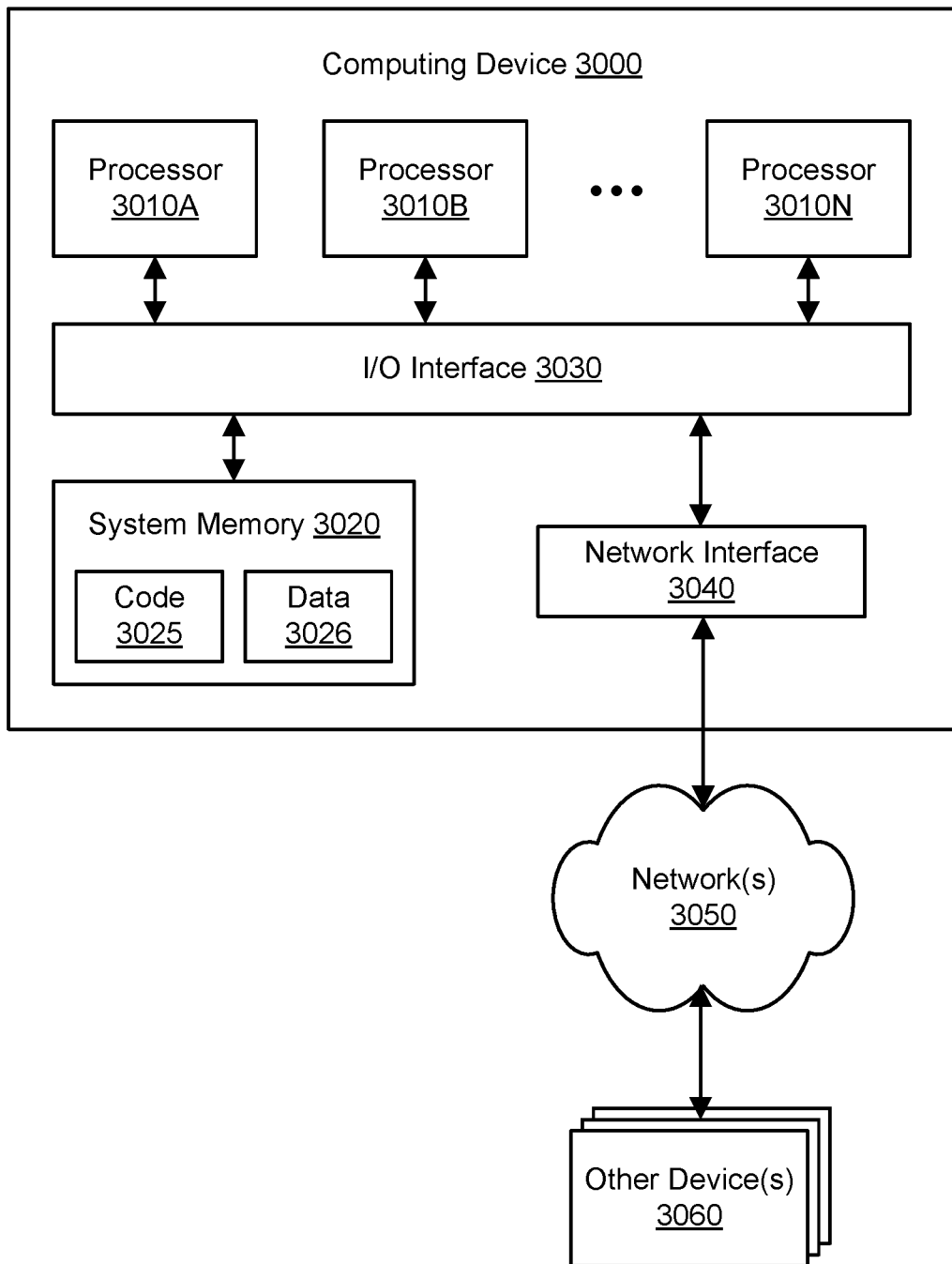
FIG. 6 illustrates an example computing device that may be used in some embodiments.

The data aggregation system 100 may be implemented using any suitable number and configuration of computing devices, any of which may be implemented by the example computing device 3000 illustrated in FIG. 6. The computing devices may be located in any suitable number of data centers or geographical locations. In various embodiments, at least some of the functionality of the data aggregation system 100 may be provided by the same computing device or by different computing devices. If any of the components of the data aggregation system 100 are implemented using different computing devices, then the components and their respective computing devices may be communicatively coupled, e.g., via one or more networks. Each of the components of the data aggregation system 100 may represent any combination of software and hardware usable to perform their respective functions, as discussed as follows. Operations implemented by the data aggregation system 100 may be performed automatically, e.g., without a need for user initiation or user intervention after an initial configuration stage, and programmatically, e.g., by execution of program instructions on at least one computing device. It is contemplated that the data aggregation system 100 may include additional components not shown, fewer components than shown, or different combinations, configurations, or quantities of the components shown.

The data aggregation system 100 as well as producers and consumers of data may be implemented in a service-oriented system in which multiple services collaborate according to a service-oriented architecture. In such an environment, the data aggregation system 100 may offer its functionality as a service to multiple clients. The clients may represent producers of data and/or consumers of data. To enable clients to invoke its functionality, the data aggregation system 100 may expose any suitable interface(s), such as one or more APIs or other programmatic interfaces and/or graphical user interfaces (GUIs). A service may be implemented using a plurality of different instances that are distributed throughout one or more networks, and each instance may offer access to the functionality of the corresponding service to various clients. In one embodiment, the functionality of the data aggregation system 100 may be offered to clients in exchange for fees, or the cost associated with running the data aggregation system 100 may be assessed to a responsible entity.

Components including the data aggregation system 100, data producers, and data consumers may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In one embodiment, components of the data aggregation system 100 may be implemented using computing resources of a provider network. A provider network may represent a network set up by an entity such as a company or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 1B:
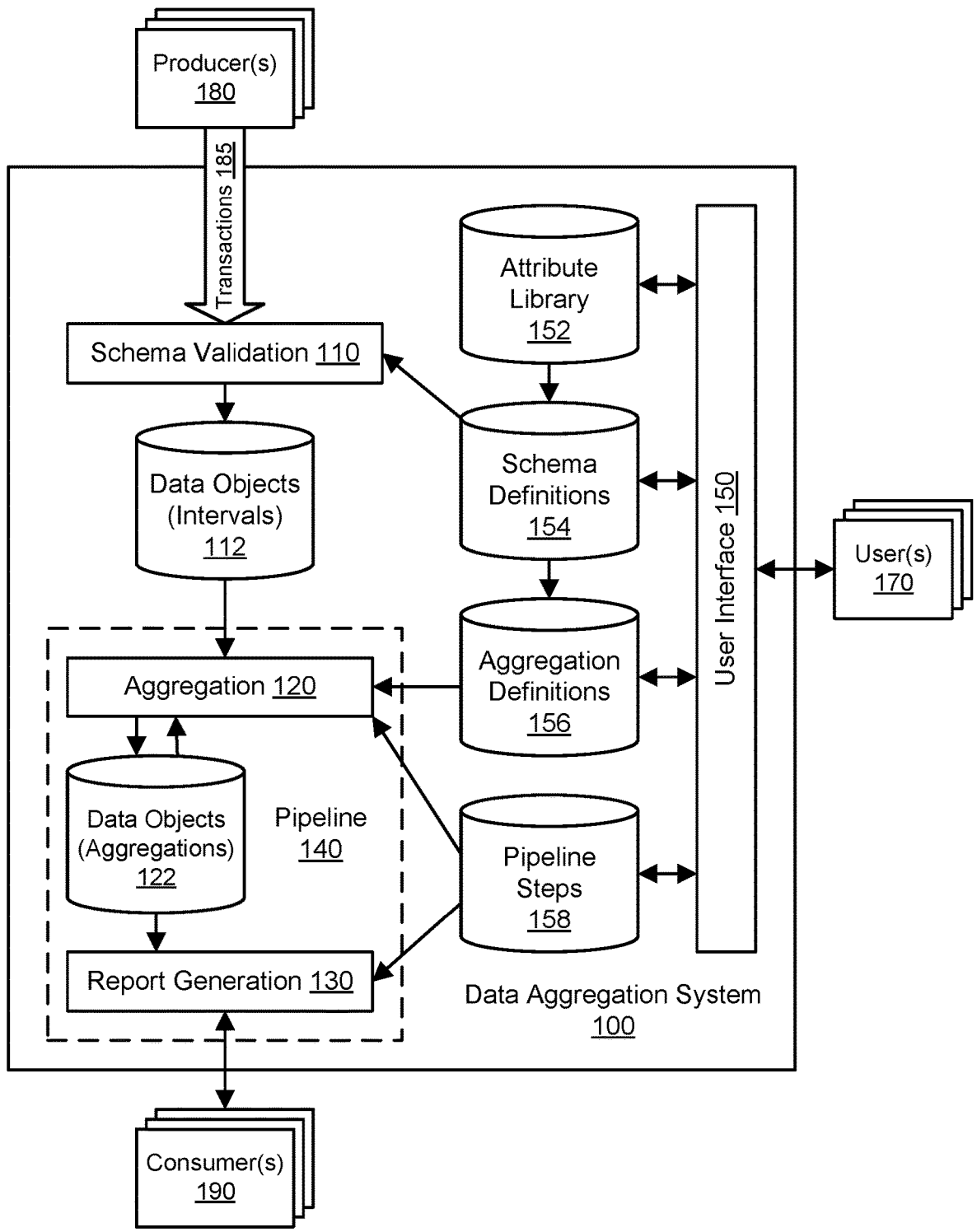

FIG. 1B illustrates an example system environment for data aggregation with schema enforcement, including a pipeline for generating reports, according to one embodiment. As discussed above, the data aggregation system 100 may store attributes 152, schema definitions 154, and aggregation definitions 156 that are predefined by users 170. In one embodiment, users may also use the user interface 150 to generate predefined pipeline steps 158. The pipeline steps may represent operations or tasks that are performed on intervals or aggregated data, e.g., in order to generate reports. Pipeline steps may permit different users to customize the processing of data to meet their differing needs. A pipeline step may be initiated automatically by the data aggregation system when particular conditions are met, e.g., when the input(s) to the step are available. As discussed above, transactions or events may be added to intervals 112, and a data object may be provided to the pipeline 140 shortly after the closing of the corresponding interval. Any pipeline steps that require that data object may then proceed to operate on the object. In some embodiments, pipeline steps may implement aggregation operations, filter operations, merge operations, and/or other report generation tasks.

In one embodiment, a first pipeline step in one pipeline may aggregate intervals into aggregations that represent longer durations of time. For example, sixty one-minute intervals may be aggregated into a single one-hour aggregation after the sixtieth interval is made available to the pipeline. This first step may be performed every hour. When the twenty-fourth such one-hour aggregation is available to the pipeline, the next pipeline step may aggregate the twenty-four one-hour aggregations into a single one-day aggregation. This second step may be performed every day. In one embodiment, the report generation 130 may use each one-day aggregation as the basis for a report; generation of the report may represent another pipeline step that is performed when the requisite input is available. Similarly, when the thirtieth or thirty-first such one-day aggregation is available to the pipeline, yet another pipeline step may aggregate the one-day aggregations into a single one-month aggregation. In one embodiment, the report generation may use each one-month aggregation as the basis for a report. In another pipeline, potentially as defined by a different user, transactions or events may be aggregated at different levels of granularity. In yet another pipeline, intervals may be sliced according to various attributes (in addition to or instead of their date) in order to produce slices that are of interest to a particular user or set of users.

Figure 2:
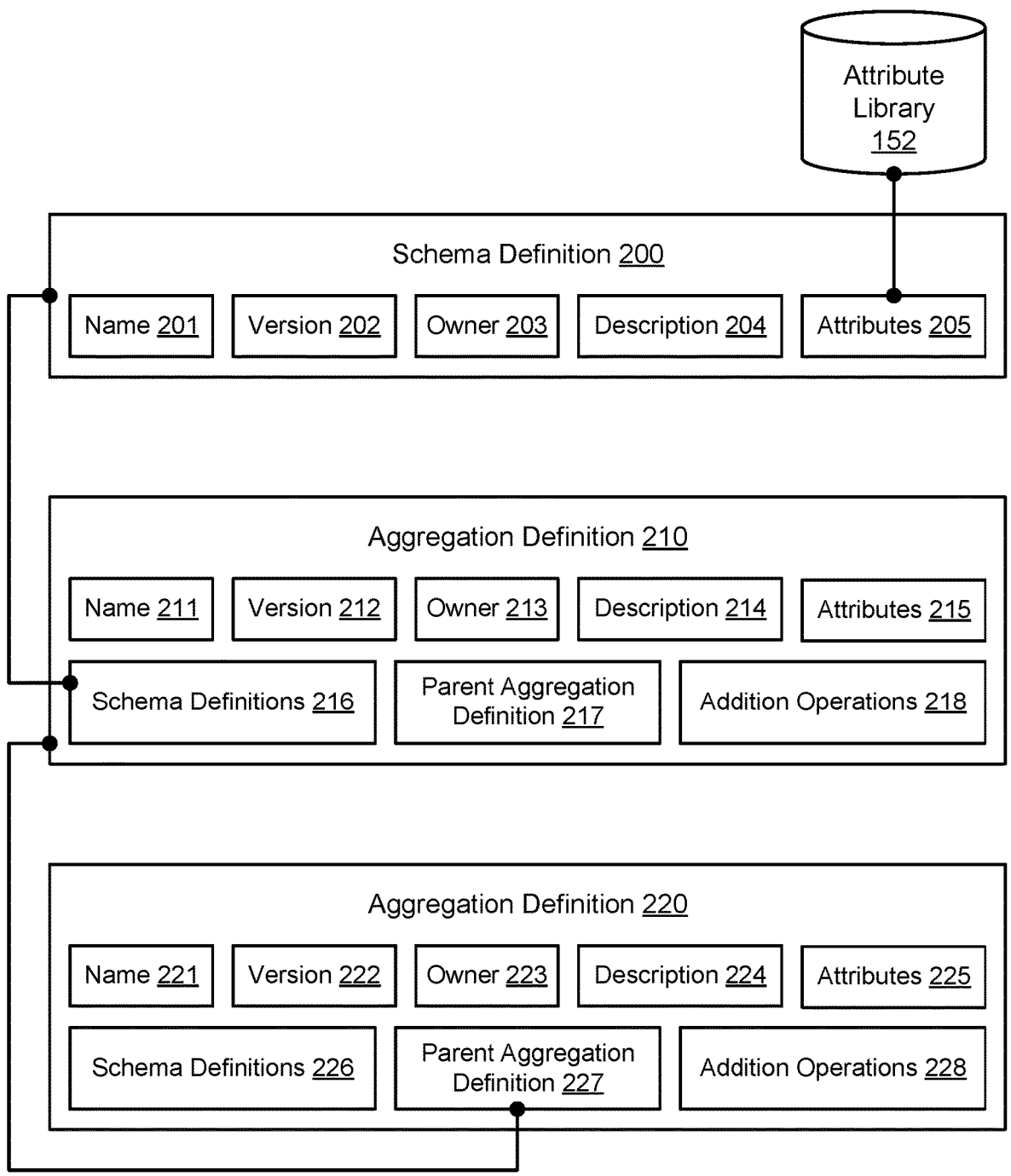
FIG. 2 illustrates further aspects of the example system environment for data aggregation with schema enforcement, including links between schema definitions and aggregation definitions, according to one embodiment.

FIG. 2 illustrates further aspects of the example system environment for data aggregation with schema enforcement, including links between schema definitions and aggregation definitions, according to one embodiment. Using the user interface 150, one or more users 170 may build a schema definition 200. The example schema definition 200 may be maintained by the data aggregation system 100 with the library of schema definitions 154. As discussed above, the example schema definition may include elements such as a name (or other identifier) 201, a version number (or other identifier) 202, an owner 203, a human-readable description 204, and a set of one or more attributes 205. The attributes 205 may specify both attributes and values for those attributes. The attributes 205 may be consistent with attributes specified in the attribute library 152. If a particular transaction declares the schema definition 200, then that transaction may be validated (and added to the current interval in the data objects 112) if and only if the one or more attributes 205 specified in the schema definition are found in the transaction, and the transaction may be rejected (and not added to the current interval) if any of the one or more attributes 205 are not found in the transaction.

Using the user interface 150, one or more users 170 may build an aggregation definition 210. The example aggregation definition 210 may be maintained by the data aggregation system 100 with the library of aggregation definitions 156. As discussed above, the example aggregation definition 210 may include elements such as a name (or other identifier) 211, a version number (or other identifier) 212, an owner 213, a human-readable description 214, and a set of one or more attributes 215. The attributes 215 may specify both attributes and values for those attributes. The attributes 215 may be consistent with attributes specified in the attribute library 152. In one embodiment, transactions in a slice defined by the aggregation definition 210 may include the attributes 215, and transactions not having any of the required attributes 215 may be excluded from the slice.

The example aggregation definition 210 may optionally indicate one or more schema definitions 216. The data in a slice defined by the aggregation definition 210 may include only those transactions that meet the indicated schema(s). For example, as shown in FIG. 2, the aggregation definition 210 may limit the contents of its resulting slice(s) to transactions meeting the schema definition 200. In one embodiment, the up-front schema enforcement discussed above may guarantee that transactions follow the schemas that the transactions indicate they follow. The example aggregation definition 210 may also indicate one or more addition operations 218. Aggregations may represent sums of particular values, and the aggregation definition 210 may also indicate attributes to be summed using a section the addition operations 218. For example, a total amount of sales of goods (as expressed in a relevant currency) may be summed over one or more time intervals. In some embodiments, sums may be produced for more than one attribute according to an aggregation definition. In one embodiment, addition operations may represent arithmetic or statistical operations other than summation. For example, addition operations may produce the minimum or maximum from a set of input values.

Recursive or nested aggregation definitions may define a tree of aggregation definitions, and the tree may represent instructions on how to pre-compute transactions into their respective slices or sub-slices at the various levels of aggregation. The example aggregation definition 210 may optionally indicate a parent aggregation definition 217. Using the user interface 150, one or more users 170 may build another aggregation definition 220. As discussed above, the example aggregation definition 220 may include elements such as a name (or other identifier) 221, a version number (or other identifier) 222, an owner 223, a human-readable description 224, a set of one or more attributes 225, optionally one or more schema definitions 226, optionally a parent aggregation definition 227, and one or more addition operations 228. In the example of FIG. 2, the aggregation definition 210 does not declare a parent aggregation definition 217 and can thus serve as the root of a tree of aggregation definitions. As also shown in the example of FIG. 2, the aggregation definition 220 indicates that its parent aggregation definition 227 is the aggregation definition 210. Thus the example aggregation definition 220 is a child of the example aggregation definition 210 and may inherit one or more properties. For example, if the aggregation definition 220 does not indicate any schemas 226 but does indicate a parent 210, then the child aggregation definition 220 may follow the schema definition(s) 216 of that parent aggregation definition 210.

In one embodiment, a slice generated according to the child aggregation definition 220 may represent a subset of the contents of a slice generated according to the parent aggregation definition 210. For example, the parent aggregation definition 210 may slice transactions according to an attribute such as "accounting date" to limit a slice to transactions having a particular date, while the child aggregation definition 220 may slice transactions according to additional attributes such as "company code" and "account number" to produce a subset of the date-bound slice.

Schema definition 200 may indicate an owner 203, aggregation definition 210 may indicate an owner 213, and aggregation definition 210 may indicate an owner 213. Additionally, the aggregation definitions may optionally indicate parent aggregation definitions. In one embodiment, such metadata may be used to link consumers of transactions to producers of those transactions. In one embodiment, such metadata may be used for auditing or troubleshooting purposes.

Figure 3:
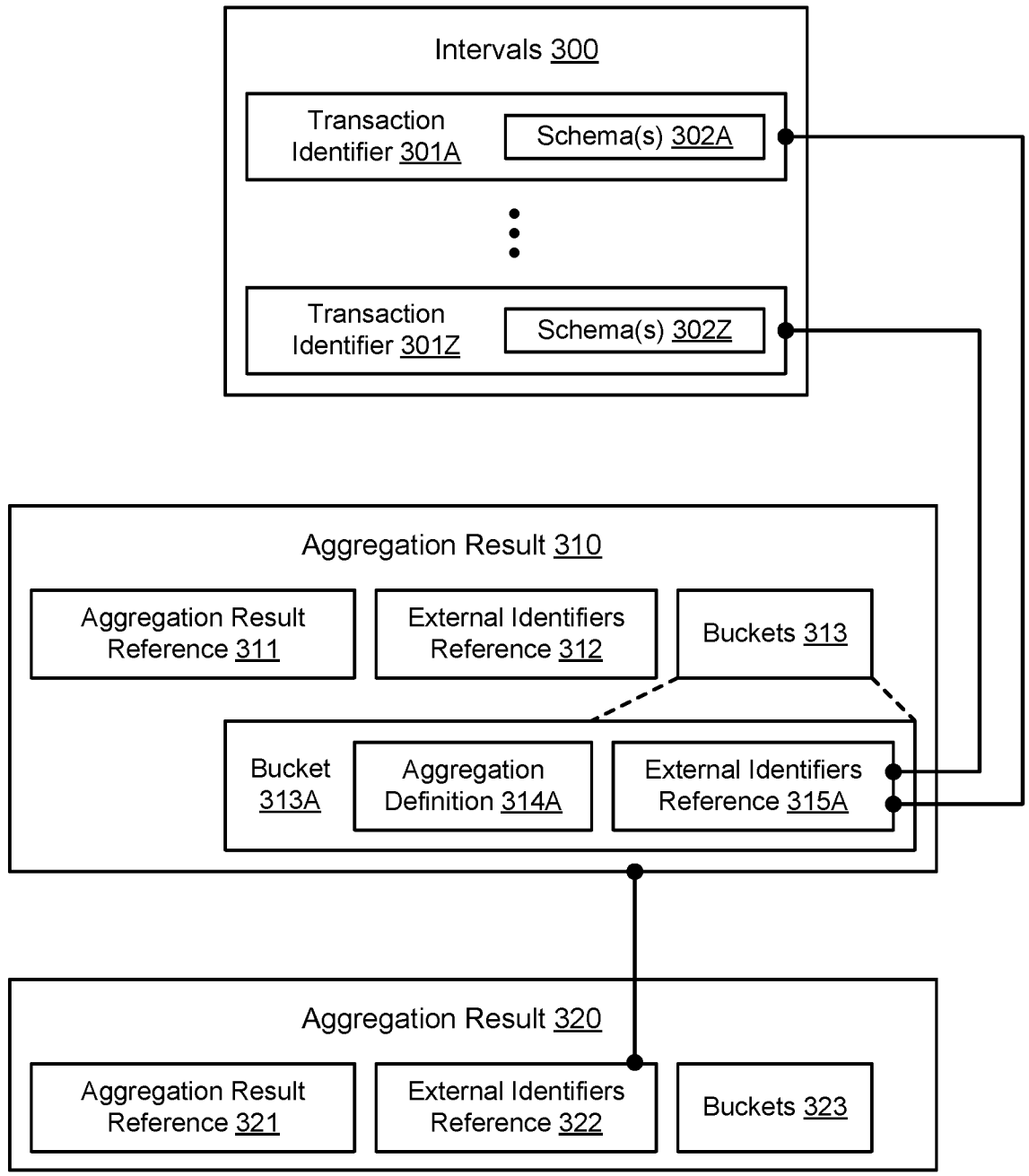
FIG. 3 illustrates further aspects of the example system environment for data aggregation with schema enforcement, including links between aggregation results and transactions, according to one embodiment.

FIG. 3 illustrates further aspects of the example system environment for data aggregation with schema enforcement, including links between aggregation results and transactions, according to one embodiment. The application of aggregation definitions, filter definitions, and/or merge definitions may result in the creation and storage of data objects 122. The aggregation objects (or other slices, such as slices created by filter or merge operations) 122 may be deemed immutable. In one embodiment, an aggregation result layer may include the data produced by applying the previous layer's definition. Application of an aggregation definition may produce an aggregation result such as example aggregation result 310. An aggregation result 310 may include an aggregation result reference 311 representing a unique identifier for the aggregation result, an external identifiers reference 312 containing pointers to the data that was used to produce the aggregation result, and buckets 313 representing the top-level entry point into the various slices of data. The buckets 313 may represent slices. Each bucket may include a reference to the aggregation definition from which it was created. Each bucket may include a reference to the pointers which in turn point to the data used in the bucket. For example, a particular bucket 313A may indicate an aggregation definition 314A and an external identifiers reference 315A. The external identifiers reference 315A may point to a set of transactions 301A through 301Z in one or more intervals 300, where each of the transactions declares one or more schemas (e.g., schema(s) 302A and 302Z) for which the transaction has been validated.

In one embodiment, another aggregation result 320 may including an aggregation result reference 321, buckets 323, and an external identifiers reference 322 that links the aggregation result back to the previous aggregation result 320. For example, the external identifiers reference 322 of the child may indicate the aggregation result reference 311 of the parent, and the external identifiers references of the parent may then link to the underlying transactions 301A-301Z. Using these links, a child aggregation result 320 may permit a user to drill down into the underlying transactions 301A-301Z without needing to store the direct links to the transactions in the child aggregation result 320. The use of efficient data structures in this manner may permit the data aggregation system 100 to scale well for a large number of aggregations. In one embodiment, an aggregation result may be expressed according to the following example:

```
'AggregationResult@1.0'::{
    aggregation_result_reference: <uuid>,
    external_identifiers_reference: <uuid>,
    buckets: [
        <'Bucket@1.0'>,
    ],
}
'Bucket@1.0'::{
    aggregation_definition: <symbol>,
    external_identifiers_reference: <uuid>,
}
```

In one embodiment, an external identifiers object may capture the various types of pointers to data that was used to produce an aggregation result or slice (bucket). By modeling the data in this manner, a lineage of data may be captured for purposes of auditing, reconciliation, and/or troubleshooting. Additionally, the use of external identifiers objects may prevent a consumer from having to deserialize a large number of values in a given bucket if such deserialization is not desired, and thus the performance of the data aggregation system may be improved. In one embodiment, the external identifiers in a bucket reference aggregation values. In one embodiment, an external identifiers object may be expressed according to the following example:

```
'ExternalIdentifiers@1.0':: {
    external_identifiers_reference: <uuid>,
    external_identifiers: {
        interval_identifiers: [ // optional
            <string>,
        ],
        aggregation_result_references: [ // optional
            <uuid>,
        ],
        filter_result_references: [ // optional
            <uuid>,
        ],
        merge_result_references: [ // optional
            <uuid>,
        ],
        transaction_identifiers: [ // optional
            <string>,
```

```
        ],
        aggregation_value_references: [ // optional
            <uuid>,
        ],
    },
}
```

In one embodiment, an aggregation value may be conceptually tied to a bucket and may be modeled separately for optimization of deserialization. By using a data structure with a recursive nature, where aggregation values contain buckets which contain aggregation values, the resulting tree of aggregation results may mirror the tree of aggregation definitions. Aggregation results may be created from other aggregation results. The cost of combining multiple aggregation results into a final aggregation result may be much lower than the cost of computing the final aggregation result directly by reading each and every transaction or interval again. In one embodiment, when an aggregation value is the result of combining other aggregation values, the external identifiers may point back to those aggregation values. In one embodiment, by following all pointers back, an aggregation value may point to a list of transactions (journal lines), and thus any level of aggregation may permit users to drill down into individual transactions. In one embodiment, an aggregation value may be expressed according to the following example:

```
'AggregationValue@1.0'::{
    aggregation_value_reference: <uuid>,
    values: [
        [
            <any>,
        ],
    ],
    external_identifiers_reference: <uuid>,
    sums: { // optional
        <value_attribute>: [
            {
                sum: <decimal|int - same type as value_attribute>,
                unit: <any - same type as unit_attribute>, // optional
            },
        ],
    },
    buckets: [
        <'Bucket@1.0'>,
    ],
}
```

In one embodiment, a filter definition may be applied on aggregation results to produce filter results representing a filtered dataset. A filter result may use a similar structure as an aggregation result and may be used nearly interchangeably. In one embodiment, a filter result may be expressed according to the following example:

```
'FilterResult@1.0':: {
    filter_result_reference: <uuid>,
    external_identifiers_reference: <uuid>,
    buckets: [
        <'Bucket@1.0'>,
    ],
    filter_definitions: [
        <symbol>,
    ],
    parameter_values: [
        [
            <any>,
```

```
        ],
    ],
}
```

In one embodiment, a merge definition may be applied on aggregation results to produce merge results representing a merged dataset. A merge result may use a similar structure as an aggregation result and may be used nearly interchangeably. In one embodiment, a merge result may be expressed according to the following example:

```
'MergeResult@1.0'::{
    merge_result_reference: <uuid>,
    external_identifiers_reference: <uuid>,
    buckets: [
        <'Bucket@1.0'>,
    ],
    merge_definitions: [
        <symbol>,
    ],
}
```

In one embodiment, metadata such as the external identifiers references may be used to drill down into individual transactions from any level of aggregation. In one embodiment, though aggregation results may include only references to the underlying transactions, those references may be followed in order to retrieve the transactions from the immutable data objects 112. For example, the external identifiers reference 315A may be used to retrieve any of the transactions 301A through 301Z that are represented in the aggregation result 310.

Figure 4:
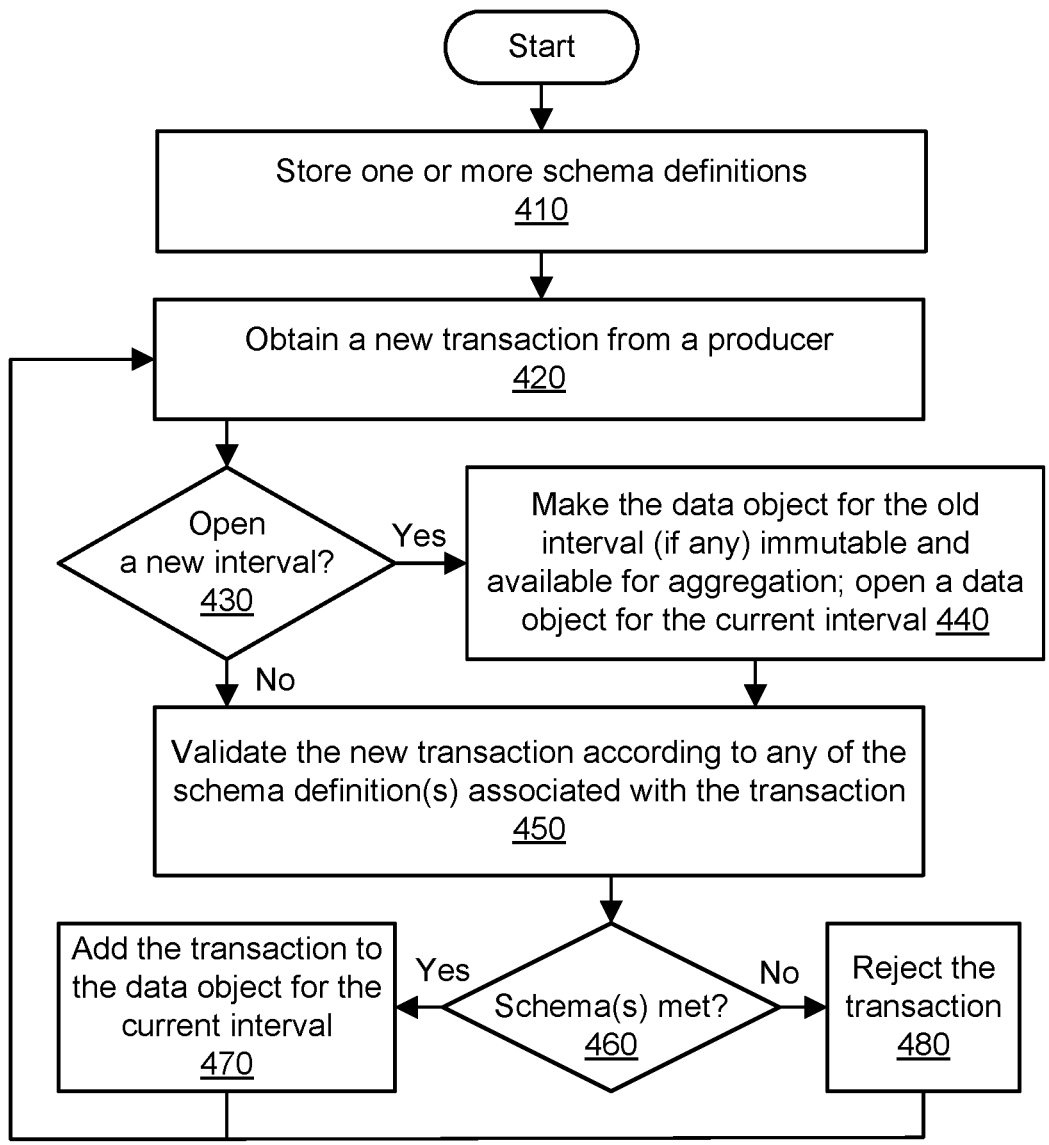
FIG. 4 is a flowchart illustrating a method for data aggregation with schema enforcement, according to one embodiment.

FIG. 4 is a flowchart illustrating a method for data aggregation with schema enforcement, according to one embodiment. As shown in 410, one or more schema definitions may be stored. A schema definition may include information such as a name, a version identifier, an owner, a human-readable description, and a set of one or more attributes. Different schema definitions may be modeled and stored independently of each other, e.g., not in the same relational database table. Schema definitions may be built by users using a user interface.

In one embodiment, transactions may be produced continually by one or more producers such as online transaction processing systems. Transactions may include financial transactions, accounting transactions, any other exchanges between two or more entities, or any other events (e.g., events that are logged in a multi-tenant provider network). Each transaction may belong to one and only one time interval. As shown in 420, a new transaction or event may be generated by a producer and obtained by a data aggregation system.

As shown in 430, the method may determine whether to open a new interval. A set of intervals may collectively represent a continuous sequence of transactions or events over time. The closing of one interval and the opening of the next interval may be dictated by the ending time of the old interval, the amount of data in the old interval, or any other basis. As shown in 440, if a new interval is to be opened, then the data object for the old interval (if any) may be "closed" and made immutable. Additionally, the data object for the old interval may be made available to a pipeline for aggregation and reporting. In one embodiment, transactions in the interval may be used for aggregation and/or reporting in near-real-time with the closing of the interval or before the close of the next consecutive interval of the same duration. As also shown in 440, a data object for the current interval may be opened. The data object may be used for storing transactions or events that are associated with the interval.

As shown in 450, the new transaction may be validated according to any relevant schema definitions. In one embodiment, the schema validation may guarantee that data behaves according to predefined rules or schemas that have been validated for that data. In one embodiment, a transaction may be validated if and only if the one or more attributes specified in a relevant schema definition are found in the transaction. For example, a schema definition called "advertising1.0" may be validated for a transaction if the transaction includes an attribute named "source" and a value for that attribute of "advertising department." To associate a transaction with one or more schemas, an individual transaction may explicitly declare the schema definition(s) which it expects to meet.

As shown in 460, the method may determine whether the schema(s) are met for the transaction. As shown in 470, if the schema(s) are met, then the transaction may be added to a data object for the current interval. For example, if a transaction is associated with the "advertising1.0" schema and meets the requirements of the schema (e.g., it includes the attribute named "source" and a value for that attribute of "advertising department"), then that transaction may be stored persistently with the current interval. As shown in 480, if the schema(s) are not met, then the transaction may be rejected and not added to the data object for the current interval. For example, if a transaction is associated with the "advertising1.0" schema and fails to meets that schema (e.g., it does not include an attribute named "source" or a value for that attribute of "advertising department"), then that transaction may not be stored persistently with the data object for the current interval. After the operations shown in 470 and 480, the method may return to the operation shown in 420 and await the receipt of additional transactions or events.

Figure 5:
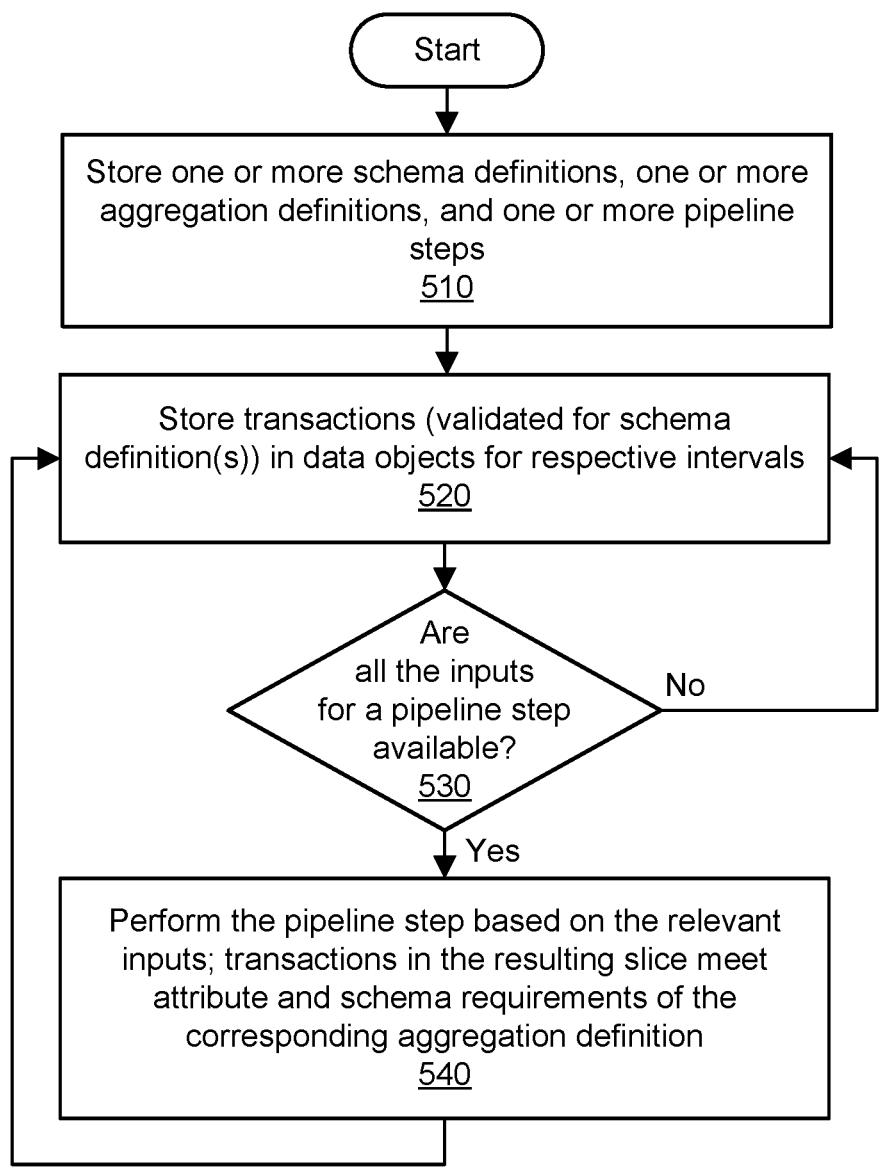
FIG. 5 is a flowchart illustrating a method for data aggregation with schema enforcement, according to one embodiment.

FIG. 5 is a flowchart illustrating a method for data aggregation with schema enforcement, according to one embodiment. As shown in 510, one or more schema definitions may be stored. A schema definition may include information such as a name, a version identifier, an owner, a human-readable description, and a set of one or more attributes. Different schema definitions may be modeled and stored independently of each other, e.g., not in the same relational database table. Schema definitions may be built by users using a user interface.

As also shown in 510, one or more aggregation definitions may be stored. An aggregation definition may define a specific slice of data. Aggregation definitions may be recursive, such that one aggregation definition may identify another aggregation definition as its parent. Recursive or nested aggregation definitions may define a tree of aggregation definitions, and the tree may represent instructions on how to pre-compute transactions into their respective slices or sub-slices at the various levels of aggregation. The aggregation definition may indicate one or more schema definitions, such that data in a resulting aggregation may include only those transactions that meet the indicated schema(s). The aggregation definition may indicate the attributes of transactions in the slice. For example, the list of attributes may indicate that transactions in a particular level of aggregation should include a particular accounting date, a particular account number, a particular company code, and/or other suitable attributes. Aggregations may represent sums of particular values, and an aggregation definition may also indicate any attributes to be summed or subjected to other arithmetic or statistical operations. For example, a total amount of sales of goods (as expressed in a relevant currency) may be summed over one or more time intervals. Aggregation definitions may also be built by users using a user interface.

As also shown in 510, one or more pipeline steps may be defined by users and stored. The pipeline steps may represent operations or tasks that are performed on intervals or aggregated data, e.g., in order to generate reports. Pipeline steps may permit different users to customize the processing of data to meet their differing needs. A pipeline step may be initiated automatically by the data aggregation system when particular conditions are met, e.g., when the input(s) to the step are available. In some embodiments, pipeline steps may implement aggregation operations on intervals, aggregation operations on aggregations, filter operations, merge operations, and/or other report generation tasks.

As shown in 520, transactions may be stored using immutable data objects for particular time intervals. As discussed above, the transactions may be validated for relevant schemas prior to being added to the data objects. The operation shown in 520 may be implemented using the operations 420 through 480 as discussed with reference to FIG. 4. Data objects may be provided to a pipeline upon the closing of the corresponding intervals.

As shown in 530, the method may determine whether all the inputs for a particular pipeline step are available. Inputs to a pipeline step may include intervals, aggregation results, filter results, merge results, and so on. If the inputs are available, then as shown in 540, an aggregation (slice) or other report-related artifact (e.g., a filter result, a merge result, or a report itself) may be generated based on the relevant input(s). By applying an aggregation definition to intervals or other aggregations, an aggregation result may be generated that references transactions meeting attribute requirements and schema requirements of the aggregation definition. In one embodiment, the transactions in the slice were previously validated for the schema definitions. As discussed above, the aggregation definition may indicate the attributes of transactions in the slice. By restricting the transactions in the aggregation result to this list of attributes, the aggregation process may slice data according to the attributes. For example, the slice may include only those transactions that include a particular accounting date, a particular account number, a particular company code, and/or other suitable attributes required for inclusion in the slice.

Some pipelines may include multiple steps and/or steps that are performed repeatedly on a schedule. For example, sixty one-minute intervals may be aggregated into a single one-hour aggregation after the sixtieth interval is made available to the pipeline, the same pipeline step may be performed every hour, and when the twenty-fourth such one-hour aggregation is available to the pipeline, the next pipeline step may aggregate the twenty-four one-hour aggregations into a single one-day aggregation. In one embodiment, the aggregation produced in 540 may be produced by the pipeline according to an "aggregate per hour" operation. In such an operation, more granular intervals (e.g., one-minute intervals) may be accumulated until an hours' worth are ready for aggregation, and then the aggregation process may combine sixty consecutive one-minute intervals into a one-hour slice. Intervals may be joined quickly using a tree combine or other efficient operation rather than needing to scan and process each individual transaction in all of the source intervals. Similarly, a further step in the pipeline may combine twenty-four consecutive one-hour slices into a one-day slice.

In one embodiment, additional aggregations may be generated based on the first aggregation produced in 540. The additional aggregations may be configured in a hierarchy such as a tree. For example, the first aggregation (according to a root-level aggregation definition) may be limited to transactions having a particular accounting date, and an additional aggregation (according to another aggregation definition) may be limited to both that accounting date and to particular values for account number and company code. As another example, yet another child aggregation may be limited to another attribute value along with the particular accounting date, account number, and company code. As shown in FIG. 5, an additional aggregation may be generated by a pipeline step that is activated when the inputs to the pipeline step (e.g., other aggregations) are available.

Illustrative Computer System

In at least some embodiments, a computer system that implements a portion or all of one or more of the technologies described herein may include a computer system that includes or is configured to access one or more computer-readable media. FIG. 6 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices configured to implement a data aggregation system, wherein the data aggregation system is configured to:
      store a plurality of schema definitions and an aggregation definition;
      validate individual transactions of a first set of transactions according to one or more respective schema definitions of the plurality of schema definitions associated with respective individual transactions of the first set of transactions, wherein the first set of transactions is associated with a first time interval associated with a starting time and an ending time;
      add the validated individual transactions of the first set of transactions to a first data object associated with the first time interval, wherein the first data object is stored persistently and indicates for the individual transactions individual ones of the schema definitions for which the respective individual transaction has been validated;
      validate individual transactions of one or more additional sets of transactions according to associated schema definitions ones of the plurality of schema definitions, and add the validated one or more additional sets of transactions to respective ones of one or more additional data objects associated with respective additional time intervals, wherein the one or more additional data objects are stored persistently and indicate for the individual transactions individual ones of the schema definitions for which the respective individual transaction has been validated; and
      generate an aggregation according to the aggregation definition, wherein the aggregation is associated with a longer duration than the first time interval, wherein the aggregation definition indicates one or more of the schema definitions such that data in the aggregation includes only those transactions that meet the indicated one or more schema definitions, wherein the aggregation definition comprises one or more attributes, wherein the aggregation represents a plurality of validated transactions in the first set and the one or more additional sets, and wherein the plurality of validated transactions represented in the aggregation are validated for the indicated one or more schema definitions and comprise the one or more attributes.

2. The system as recited in claim 1, wherein the data aggregation system is further configured to:
   generate one or more additional aggregations according to the aggregation definition; and
   generate a further aggregation according to an additional aggregation definition, wherein the further aggregation represents a plurality of validated transactions in the aggregation and the one or more additional aggregations, and wherein the further aggregation is associated with a longer duration than the aggregation.

3. The system as recited in claim 1, wherein the data aggregation system is further configured to:
   using one or more data structures associated with the aggregation, obtain metadata associated with one of the first set of transactions.

4. The system as recited in claim 1, wherein the data aggregation system is further configured to:
   using one or more data structures associated with the aggregation, determine one or more producers of the one or more validated transactions represented in the aggregation.

5. A computer-implemented method, comprising:
   determining a plurality of validated transactions in a set of transactions, wherein the validated transactions are determined using enforcement of one or more respective schema definitions of a plurality of schema definitions associated with respective individual transactions of the set of transactions, and wherein the validated transactions are associated with a first interval;
   storing the validated transactions using a data object associated with the first interval and indicating for the individual transactions individual ones of the schema definitions for which the individual transaction has been validated; and
   generating an aggregation based at least in part on a aggregation definition, wherein the aggregation is associated with a longer duration than the first interval, wherein the aggregation definition indicates one or more of the schema definitions such that data in the aggregation includes only those transactions that meet the indicated one or more schema definitions, wherein the aggregation definition comprises one or more attributes, wherein the aggregation represents a plurality of transactions in the first interval and in one or more additional intervals, and wherein the transactions represented in the aggregation are validated for the indicated one or more schema definitions and comprise the one or more attributes.

6. The method as recited in claim 5, further comprising:
generating a further aggregation based at least in part on an additional aggregation definition, wherein the aggregation represents a plurality of transactions in the aggregation and in one or more additional aggregations, and wherein the further aggregation is associated with a longer duration than the aggregation.

7. The method as recited in claim 5, further comprising:
using one or more data structures associated with the aggregation, obtaining metadata associated with one of the transactions in the first interval.

8. The method as recited in claim 5, further comprising:
using one or more data structures associated with the aggregation, determining one or more producers of the plurality of transactions represented in the aggregation.

9. The method as recited in claim 5, wherein the one or more schema definitions and the aggregation definition comprise one or more owner identifiers.

10. The method as recited in claim 5, further comprising:
generating a report based at least in part on the validated transactions associated with the first interval before an end of a next consecutive interval of a same duration as the first interval.

11. The method as recited in claim 5, wherein an individual transaction in the set of transactions indicates one or more of the schema definitions for which the individual transaction is validated.

12. The method as recited in claim 5, wherein the schema definitions represent one or more rules for transaction contents or transaction sources, wherein the validated transactions are determined to follow the one or more rules, and wherein the method further comprises:
determining one or more invalidated transactions in the set of transactions, wherein the one or more invalidated transactions are determined not to follow the one or more rules.

13. A non-transitory computer-readable storage medium storing program instructions computer-executable to perform:
determining a plurality of validated events in a set of events, wherein the validated events are determined using one or more respective schema definitions associated with respective individual events of the set of events, and wherein the validated events are associated with a first interval;
storing the validated events using a data object associated with the first interval and indicating for the individual events individual ones of the schema definitions for which the individual event has been validated; and
generating an aggregation based at least in part on an aggregation definition, wherein the aggregation is associated with a longer duration than the first interval, wherein the aggregation definition indicates one or more of the schema definitions such that data in the aggregation includes only those events that meet the indicated one or more schema definitions, wherein the aggregation definition comprises one or more attributes, wherein the aggregation represents a plurality of events in the first interval and in one or more additional intervals, and wherein the events represented in the aggregation are validated for the indicated one or more schema definitions and comprise the one or more attributes.

14. The non-transitory computer-readable storage medium as recited in claim 13, wherein the program instructions are further computer-executable to perform:
generating a further aggregation based at least in part on an additional aggregation definition, wherein the aggregation represents a plurality of events in the aggregation and in one or more additional aggregations, and wherein the further aggregation is associated with a longer duration than the aggregation.

15. The non-transitory computer-readable storage medium as recited in claim 13, wherein the program instructions are further computer-executable to perform:
using one or more data structures associated with the aggregation, obtaining metadata associated with one of the events in the first interval.

16. The non-transitory computer-readable storage medium as recited in claim 13, wherein the one or more schema definitions and the aggregation definition indicate one or more owners.

17. The non-transitory computer-readable storage medium as recited in claim 13, wherein the program instructions are further computer-executable to perform:
generating a filtered dataset based at least in part on a filter definition and on the aggregation definition.

18. The non-transitory computer-readable storage medium as recited in claim 13, wherein the program instructions are further computer-executable to perform:
generating a merged dataset based at least in part on a merge definition and on the aggregation definition.

19. The non-transitory computer-readable storage medium as recited in claim 13, wherein an individual event in the set of events indicates one or more of the schema definitions for which the individual event is validated.

20. The non-transitory computer-readable storage medium as recited in claim 13, wherein the aggregation and one or more further aggregations are generated based at least in part on a plurality of pipeline steps, wherein the pipeline steps are predefined based at least in part on user input.

* * * * *